United States Patent [19]

Kanehira et al.

[11] Patent Number: 4,724,669
[45] Date of Patent: Feb. 16, 1988

[54] FILAMENT-WOUND CYLINDRICAL ELEMENT FOR CHAIN

[75] Inventors: Makoto Kanehira; Takashi Koizumi; Takerou Nakagawa; Kazumasa Matsuno; Yasumasa Tsubakimoto; Fumio Ochiai; Takashi Tsujimoto, all of Osaka, Japan

[73] Assignee: Tsubakimoto Chain Co., Osaka, Japan

[21] Appl. No.: 858,068

[22] Filed: Apr. 30, 1986

[30] Foreign Application Priority Data

Aug. 27, 1985 [JP] Japan .................. 60-186589

[51] Int. Cl.⁴ .................................. B21L 9/02
[52] U.S. Cl. .................................. 59/5; 59/8; 59/901; 59/4; 59/84; 156/173; 29/419 R
[58] Field of Search ............. 59/901, 4, 5, 7, 8, 59/84; 29/419 R; 156/173, 175, 169; 474/207; 403/187, 193

[56] References Cited

U.S. PATENT DOCUMENTS

| | | | |
|---|---|---|---|
| 2,699,415 | 1/1955 | Nachtman | 156/173 |
| 2,816,453 | 12/1957 | Frank et al. | 59/4 |
| 3,338,271 | 8/1967 | Plummer et al. | 156/173 |
| 3,386,872 | 6/1968 | Medney | 156/173 |
| 3,733,811 | 5/1973 | Florjancic | 59/84 |
| 3,974,009 | 8/1976 | Butzow et al. | 156/173 |
| 4,367,189 | 1/1983 | Davies | 156/173 |

FOREIGN PATENT DOCUMENTS 106741  6/1984  Japan ........................ 59/4

Primary Examiner—Robert L. Spruill
Assistant Examiner—David B. Jones
Attorney, Agent, or Firm—Dann, Dorfman, Herrell and Skillman

[57] ABSTRACT

A conveyor or chain having a tubular filament-wound cylindrical element used as the pins interconnecting the link plates and/or as rollers or bushings in the chain assembly. The element is formed from a length of tubular material which is wound on a mandrel having an outside diameter equal to the inside diameter of the tubular element. The filament of the winding is a long aramid fiber which is integrated in the tubular material by an adhesive agent.

5 Claims, 5 Drawing Figures

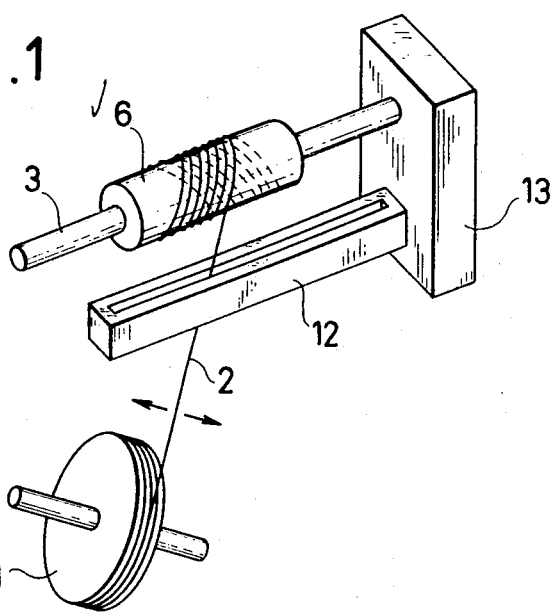
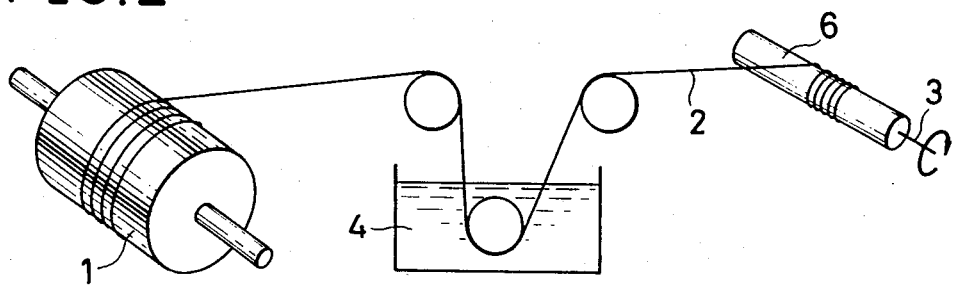
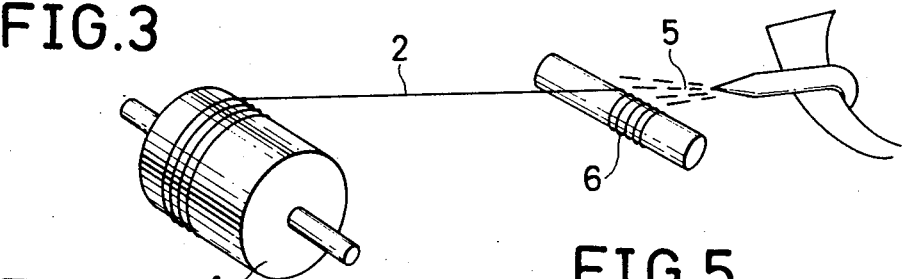
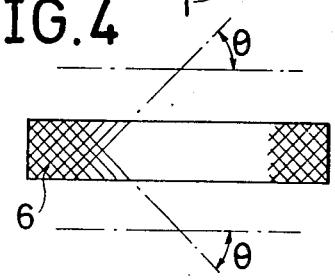
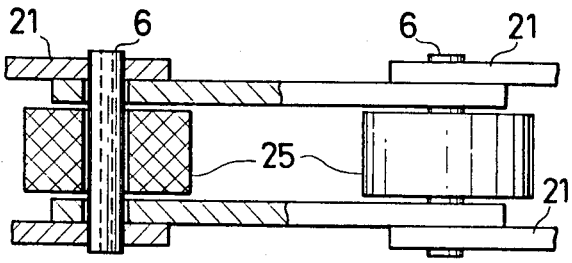

FILAMENT-WOUND CYLINDRICAL ELEMENT FOR CHAIN

FIELD OF THE INVENTION

The present invention relates to a cylindrical element such as the pin, bushing and roller of a chain, and the method of making the same.

DESCRIPTION OF THE PRIOR ART

Conventionally, cylindrical elements such as the pin, bushing and roller of a chain are all made of steel or synthetic resin. However, these cylindrical elements have disadvantages that the element made of steel is heavy, and the element made of synthetic resin has a low strength even if it is made of fiber-reinforced plastic.

SUMMARY OF THE INVENTION

The object of the present invention is to provide a cylindrical element for a chain which has a smaller specific gravity than steel and has a high tensile strength. To acheive that object, a long fiber of high tensile strength such as recently developed aramid fiber, carbon fiber and boron fiber is tightly wound on itself to form the cylindrical element.

For example, the strong long fiber is densely wound on itself in alternately-switched oblique directions sufficiently crossed with each other as to form a series of overlaid wound-fiber layers on a rotating cylindrical surface. The layers of the wound fiber are all solidified together with an adhesive agent to make a length of tubular material. The cylindrical element is made from the length of tubular material.

Since the strong fiber of the tubular material is obliquely wound as described above, the cylindrical element made from the material, as the pin, bushing, roller or the like of the chain, is much higher in shearing strength and bending strength and smaller in weight than conventional cylindrical elements.

BRIEF DESCRIPTION OF THE DRAWINGS

FIG. 1 is a schematic view indicating the winding manufacture of a length of tubular material according to the present invention;

FIGS. 2 and 3 are schematic views of respectively different means for applying adhesive agents to wound fibers;

FIG. 4 illustrates a length of tubular material made in accordance with the invention; and FIG. 5 is a fragmentary view partially in section of a roller chain embodying cylindrical elements made in accordance with the invention.

DETAILED DESCRIPTION OF PREFERRED EMBODIMENTS

FIG. 1 shows the winding manufacture of a length of tubular material, in which a long aramid fiber 2 is wound on itself on a rotary shaft 3 which serves as a mandrel, while an appropriate tensile force is applied to the fiber 2 by a conventional traverse and tension means shown diagrammatically at 12 in the drawing. In the winding manufacture, the rotation of the shaft 3 is coordinated with the traverse and tension means, as indicated at 13, to produce a prescribed winding angle $\theta$ between the fiber 2 and the axis of the shaft 3, and the fiber 2 is gradually shifted from one end toward the other. After the first layer of the fiber 2 is wound, the second layer thereof is wound while the fiber is being shifted in the opposite direction from the latter end toward the former end and the prescribed winding angle $\theta$ is so differently set between the fiber and the axis of the shaft 3 that the fiber of the second layer is sufficiently crossed with that of the first layer. For uniformity, it is preferred that the winding angles in adjacent layers be equal and opposite. These alternate winding operations are repeated so as to attain a desired diameter for the tubular material. Instead of switching the winding angle $\theta$ for every single layer of the fiber 2, the winding angle may be switched for every appropriate equal or unequal number of layers.

Although the individual convolutions of the fiber or filament 2 in the length 6 of tubular material shown schematically in FIG. 4 are illustrated widely-spaced, in the preferred embodiments the traverse mechanism positions the adjacent convolutions closely adjacent one another to minimize the voids between the fibers and create a dense winding. In this fashion the tubular material has well-defined inner and outer cylindrical diameters.

Before the aramid fiber 2 is wound on the shaft 3, the fiber may be passed through molten resin or metal 4, as shown in FIG. 2. Otherwise, powder of resin or metal is melt-sprayed at 5 onto the wound fiber. The wound fiber 2 is thus solidified as one piece. If the molten resin or metal excessively clings to the surface of the tubular material 6 immediately after the winding of the fiber 2, the excess resin or metal is wiped off so that the outer cylindrical surface of the tubular material 6 is finished to be smooth. After the wound fiber 2 is solidified, the rotary drive shaft 3 is pulled out of the wound fiber, so that the length of tubular material 6 is provided with a smooth inner cylindrical surface.

Since the inside diameter of the tubular material 6 is equal to the outside diameter of the rotary shaft 3, the outside surface of the shaft is previously subjected to a hard chromium plating in order to enhance the hardness of the outside surface of the shaft 3 and improve the accuracy of the inside diameter of the tubular material 6.

The cylindrical element produced in accordance with the present invention may serve to interconnect the parallel links which are arranged in pairs in a roller chain or other link-type chain. The connecting means includes a cylindrical element having an axis perpendicular to said link plates. To this end, as shown in FIG. 5, the hollow cylindrical element produced by the length of material 6 may be press-fitted as a pin in the hole of a chain link 21, without being processed. It may also be used as a bushing, or as a roller as shown at 25 in FIG. 5. In this case the cylindrical material 6 is cut off or otherwise machined to a prescribed length to produce a bushing or a roller of the desired dimensions. Preferably the element is wound to have the desired inner and outer diameter, so that the axial dimension is the only dimension subject to being machined.

Since the tubular material is manufacturing by densely winding the long fiber of high strength in successive layers, while alternately switching the prescribed winding angle for every appropriate number of layers, according to the present invention, the cylindrical element for a chain, which is made from the tubular material, is much lighter and stronger than a chain with conventional cylindrical elements. For example, a cylindrical element made of an aramid fiber according to the present invention is four to five times less in weight and at least two times higher in strength than a conventional cylindrical element made of steel. Therefore, a chain of low weight and high strength can be manufactured according to the present invention, so as to enable the transmission of high motive power and the conveyance of heavy cargo.

We claim:

1. A chain having a pair of parallel link plates and means interconnecting said link plates, said interconnecting means including a cylindrical element having an axis perpendicular to said link plates and comprising a length of tubular material composed of a series of layers of dense windings of a strong long fiber, the windings in the layers alternately switching the oblique winding angle for every appropriate number of the layers, all the layers of the wound fiber being solidified together with an adhesive agent.

2. A chain comprising parallel links arranged in pairs, and a plurality of interconnecting means spanning between and interconnecting said links to maintain assembly of the chain, each of said interconnecting means including a cylindrical element comprising a length of tubular material composed of a series of layers of dense windings of a strong long fiber, and windings in the layers alternately switching the oblique winding angle for every appropriate number of the layers, all the layers of the wound fiber being solidified together with an adhesive agent.

3. A link chain according to claim 2 wherein each link has a pair of holes, each said cylindrical element comprises a pin interconnecting said link and engaged in said link holes of said parallel links.

4. A link chain according to claim 3 wherein each of said cylindrical elements is press-fitted into one link hole in at least one of the links.

5. A roller chain according to claim 2 wherein each said connecting means comprises a pin interconnecting said links, and a roller mounted on said pins for rotation relative to said links, said roller comprising said cylindrical element.

* * * * *